US012656180B2

(12) United States Patent
Choi et al.

(10) Patent No.: US 12,656,180 B2
(45) Date of Patent: Jun. 16, 2026

(54) SYSTEM, APPARATUS AND METHOD FOR PROVIDING TEMPERATURE

(71) Applicant: Hanwha Vision Co., Ltd., Seongnam-si (KR)

(72) Inventors: Hye Lyoung Choi, Seongnam-Si (KR); Sang Yun Lee, Seongnam-Si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 47 days.

(21) Appl. No.: 18/605,295

(22) Filed: Mar. 14, 2024

(65) Prior Publication Data
US 2024/0219241 A1      Jul. 4, 2024

Related U.S. Application Data

(63) Continuation of application No. PCT/KR2022/017934, filed on Nov. 15, 2022.

(30) Foreign Application Priority Data

Nov. 16, 2021    (KR) ........................ 10-2021-0157223

(51) Int. Cl.
G01J 5/48          (2022.01)
G01J 5/00          (2022.01)
          (Continued)

(52) U.S. Cl.
CPC ............ G01J 5/48 (2013.01); G06F 3/04817 (2013.01); G06F 3/0482 (2013.01);
          (Continued)

(58) Field of Classification Search
CPC ........ G01J 5/48; G01J 2005/0077; G01J 5/00; G01J 5/02; G01J 5/60; G01J 5/0025;
          (Continued)

(56) References Cited

U.S. PATENT DOCUMENTS

2010/0265332 A1* 10/2010 George-Svahn ....... H04N 23/23
                                                              348/222.1
2016/0027171 A1*  1/2016 Spahn ...................... G01J 5/00
                                                              382/128
          (Continued)

FOREIGN PATENT DOCUMENTS

JP        2010-194074 A      9/2010
JP        2016-151428 A      8/2016
          (Continued)

OTHER PUBLICATIONS

English translation (Year: 2010).*
          (Continued)

*Primary Examiner* — Fernando Alcon
(74) *Attorney, Agent, or Firm* — Sughrue Mion, PLLC

(57)          ABSTRACT
An apparatus for providing temperature information includes a receiver configured to receive a first image and a second image of a same scene, the first image being captured by a visible light camera and the second image being captured by an infrared camera, an image editing device configured to set a reference area for an object selected by a user based on pixel values in the second image and generate an edited image with the reference area displayed in the first image or the second image, and a transmitter configured to transmit the edited image.

20 Claims, 19 Drawing Sheets

500

(51) Int. Cl.

| | | |
|---|---|---|
| *G06F 3/04817* | (2022.01) | |
| *G06F 3/0482* | (2013.01) | |
| *G06F 3/04845* | (2022.01) | |
| *G06V 10/94* | (2022.01) | |
| *H04N 7/18* | (2006.01) | |
| *H04N 23/11* | (2023.01) | |

(52) U.S. Cl.
   CPC ........ *G06F 3/04845* (2013.01); *G06V 10/945*
        (2022.01); *H04N 7/183* (2013.01); *H04N
        23/11* (2023.01); *G01J 2005/0077* (2013.01)

(58) Field of Classification Search
   CPC .... G01J 5/025; G06F 3/04817; G06F 3/0482;
        G06F 3/04845; G06V 10/945; H04N
        7/183; H04N 23/11; H04N 7/18
   See application file for complete search history.

(56) References Cited

U.S. PATENT DOCUMENTS

| | | | | |
|---|---|---|---|---|
| 2016/0080664 A1* | 3/2016 | Henry | .................. | H04N 23/631 348/164 |
| 2018/0027205 A1* | 1/2018 | Ruther | ................... | G01J 5/025 348/164 |

| | | | | |
|---|---|---|---|---|
| 2020/0007797 A1* | 1/2020 | Covington | ........... | G06V 10/143 |
| 2021/0074139 A1* | 3/2021 | Sulucz | ................... | G08B 21/24 |
| 2021/0190594 A1* | 6/2021 | Mead | .................... | G01J 5/0859 |
| 2021/0258543 A1* | 8/2021 | Griffis | ................... | H04N 23/56 |
| 2021/0325251 A1* | 10/2021 | Maeda | .................. | G06F 3/0485 |
| 2021/0390804 A1* | 12/2021 | Rajamanickam | .... | A61B 5/0008 |
| 2022/0090811 A1* | 3/2022 | Li | .......................... | G01J 5/0025 |
| 2024/0040215 A1* | 2/2024 | Nobuoka | .............. | G01J 5/0846 |

FOREIGN PATENT DOCUMENTS

| | | | | |
|---|---|---|---|---|
| JP | 2020-187557 A | 11/2020 | | |
| KR | 10-2019-0131646 A | 11/2019 | | |
| KR | 10-2196813 B1 | 12/2020 | | |
| WO | WO-2016182961 A1 * | 11/2016 | ............ | H04N 23/23 |
| WO | WO-2019203351 A1 * | 10/2019 | ............. | G01J 5/026 |

OTHER PUBLICATIONS

WO_2019203351_A1 English translation (Year: 2019).*
International Search Report and Written Opinion (PCT/ISA/210 and PCT/ISA/237) dated Feb. 21, 2023, issued by International Searching Authority for International Application No. PCT/KR2022/017934.

* cited by examiner

500

520    410    510    630

610

621 622

SYSTEM, APPARATUS AND METHOD FOR PROVIDING TEMPERATURE

CROSS-REFERENCE TO RELATED APPLICATIONS

This application is a continuation of International Application No. PCT/KR2022/017934, filed on Nov. 15, 2022, in the Korean Intellectual Property Receiving Office, which is based on and claims priority to Korean Patent Application No. 10-2021-0157223, filed on Nov. 16, 2021, in the Korean Intellectual Property Office, the disclosures of which are incorporated herein by reference in their entireties.

BACKGROUND

1. Field

Example embodiments of the disclosure relate to a system, apparatus, and method for providing temperature information, and more particularly, to a system, apparatus, and method for providing temperature information including the temperature of an object through a screen.

2. Description of Related Art

Thermometers may be used to measure human body temperature. However, it may be impractical to use thermometers to measure the body temperature of multiple people. For example, utilizing a thermometer to assess the body temperature of each person in a populous gathering may be an inefficient process, and this approach may result in the inadvertent omission of some individuals.

Infrared cameras may be used to measure human body temperature. Body temperature may be measured through images captured by infrared cameras. Using an infrared camera, it is possible to measure the temperatures of many people in a crowd. However, since images produced by infrared cameras are determined by the manufacturer, it may take a considerable amount of time for users to become accustomed to such images.

Therefore, there is a need for easy verification of each person's body temperature by referring to images captured by infrared cameras.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided are a system, apparatus, and method for providing temperature including the temperature of an object through a screen.

Additional aspects will be set forth in part in the description which follows and, in part, will be apparent from the description, or may be learned by practice of the presented embodiments.

According to an aspect of the disclosure, an apparatus for providing temperature information may include a receiver configured to receive a first image and a second image of a same scene, the first image being captured by a visible light camera and the second image being captured by an infrared camera, an image editing device configured to set a reference area for an object selected by a user based on pixel values in the second image and generate an edited image with the reference area displayed in the first image or the second image, and a transmitter configured to transmit the edited image.

The image editing device may be configured to set the reference area with a predetermined range of temperatures around a target point selected by the user in the first image or the second image, based on the pixel values in the second image, and the image editing device may be further configured to display the reference area in the first image or the second image.

The image editing device may be configured to set the reference area by setting at least one reference area with a predetermined range of temperatures corresponding to a target area selected by the user in the first image or the second image, based on the pixel values in the second image, and the image editing device may be further configured to display the at least one reference area in the first image or the second image.

The edited image may include an image output area and an event output area, and the image editing device may be further configured to include the first image in the image output area, and based on a temperature of the reference area exceeding a predetermined threshold temperature, include event information for the reference area in the event output area.

The event information may include at least one of a location of an object corresponding to the reference area, the temperature of the reference area, and a time of measurement of the temperature of the reference area.

The apparatus may include an interface device configured to provide an interface, the interface configured to provide user convenience information or receive user convenience commands.

The interface device may be further configured to display a temperature bar that visually represents a temperature range of the reference area and position an icon enabling an adjustment of an upper limit temperature and a lower limit temperature.

The image editing device may be further configured to identify at least one surrounding object with temperatures within a range between the upper limit temperature and the lower limit temperature, and display at least one surrounding reference area for the at least one surrounding object in the first image.

The image editing device may be configured to provide event information in an event output area for at least one reference area that exceeds a predetermined threshold temperature.

The interface device may be further configured to display a color list for selecting a reference color that represents the second image.

The interface device may be further configured to, based on a custom color item being selected from the color list, activate an icon for selecting a custom color.

The interface device may be further configured to display a temperature bar that visually represents a temperature range of the second image, and change a temperature interval selected by the user from the temperature bar to the custom color selected by the user.

The image editing device may be further configured to display an area in the second image within a temperature range selected by the user in the custom color selected by the user.

According to an aspect of the disclosure, an apparatus for providing temperature information may include a first sensor configured to generate a first image by detecting visible light from a scene, a second sensor configured to generate a second image by detecting infrared light from the scene, an image editing device configured to set a reference area for an object selected by a user based on pixel values in the second image, and generate an edited image with the reference area displayed in the first image or the second image, and a transmitter configured to transmit the edited image.

According to an aspect of the disclosure, a system for providing temperature information may include an apparatus configured to provide temperature information, and to generate an edited image comprising temperature information for an object selected by a user, a management server configured to receive and store the edited image, and a monitoring device configured to receive the edited image by accessing the management server, and to output the edited image received from the management server, where the apparatus may include a receiver configured to receive a first image and a second image of a same scene, the first image being captured by a visible light camera and the second image being captured by an infrared camera, an image editing device configured to set a reference area for the object selected by the user based on pixel values in the second image and generate the edited image with the reference area displayed in the first image or the second image, and a transmitter configured to transmit the edited image.

According to an aspect of the disclosure, a method of providing temperature information may include receiving a first image and a second image of a same scene, the first image being captured by a visible light camera and the second image being captured by an infrared camera, setting a reference area with a predetermined range of temperatures around a target point selected by a user in the first image based on pixel values in the second image, displaying the reference area in the first image or the second image, and transmitting the first image or the second image with the reference area displayed therein to a monitoring device.

The method may include providing the first image in an image output area and, based on a temperature of the reference area exceeding a predetermined threshold temperature, providing event information for the reference area in an event output area.

The method may include providing an interface, and providing the interface may include displaying a temperature bar that visually represents a temperature range of the reference area, and positioning an icon enabling an adjustment of an upper limit temperature and a lower limit temperature.

According to an aspect of the disclosure, a method of providing temperature information may include generating a first image by detecting visible light from a scene, generating a second image by detecting infrared light from the scene, setting a reference area for an object selected by a user based on pixel values in the second image, generating an edited image with the reference area displayed in the first image or the second image, and transmitting the edited image.

Setting the reference area may include setting the reference area with a predetermined range of temperatures around a target point selected by the user in the first image or the second image based on pixel values in the second image, and the method may include displaying the reference area in the first image or the second image.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
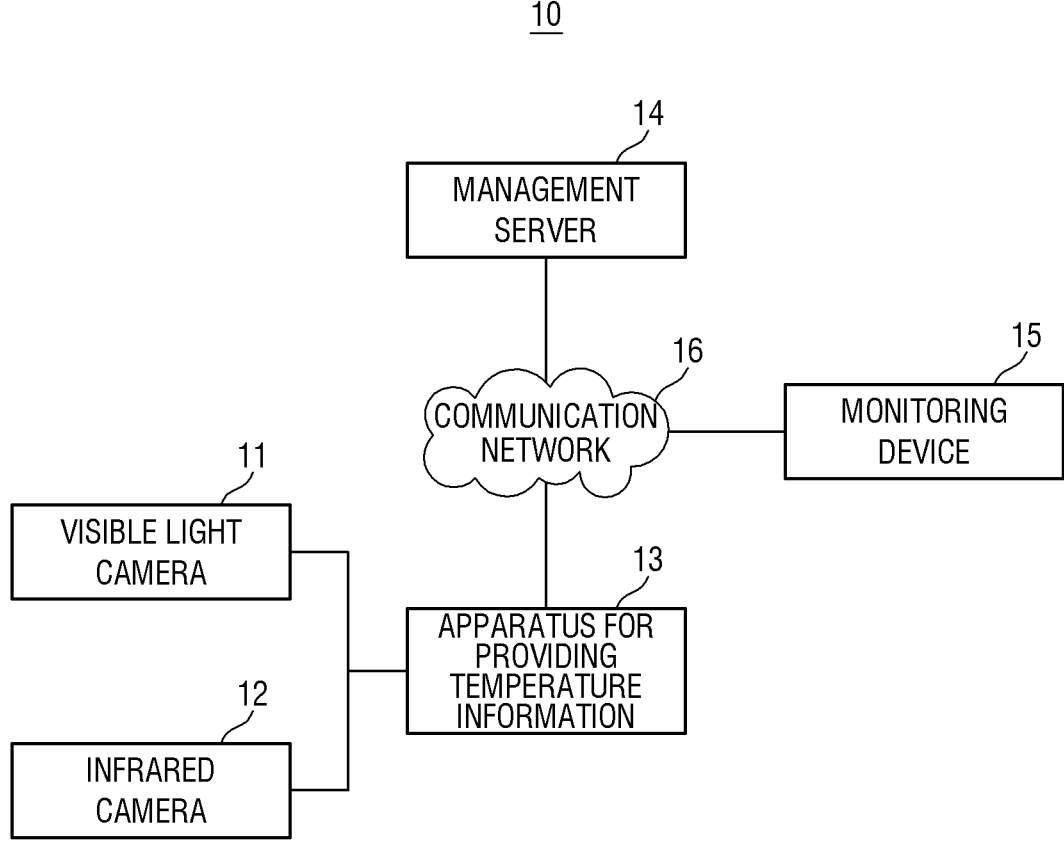
FIG. 1 is a block diagram of a system for providing temperature information according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless defined otherwise, all terms used herein, including technical and scientific terms, should be interpreted as commonly understood by those skilled in the field to which this invention belongs. Terms defined in commonly used dictionaries should not be interpreted in an idealized or overly formal sense unless explicitly defined.

Figure 2:
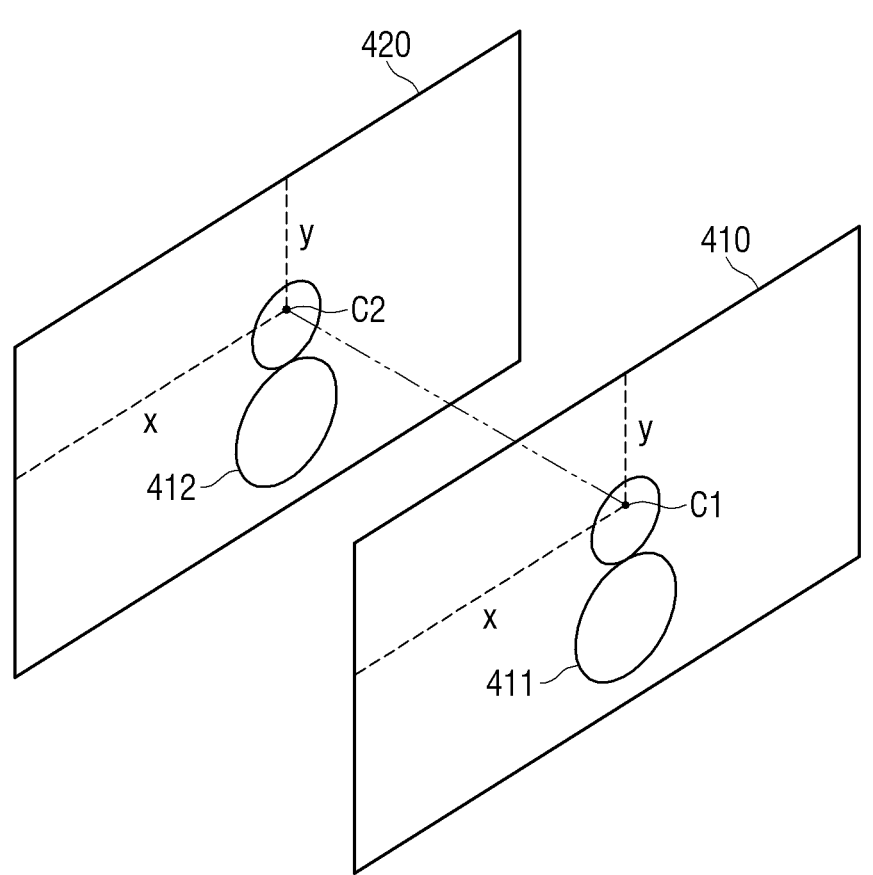
FIG. 2 is a diagram illustrating the coordinate relationship between first and second images according to an embodiment.

FIG. 1 is a block diagram of a system for providing temperature information according to an embodiment. FIG. 2 is a diagram illustrating the coordinate relationship between first and second images according to an embodiment.

Referring to FIG. 1, a system 10 for providing temperature information may include a visible light camera 11, an infrared camera 12, an apparatus 13 for providing temperature information, a management server 14, a monitoring device 15, and a communication network 16.

The visible light camera 11 may receive visible light to generate an image of a surrounding environment, and the infrared camera 12 may receive infrared light to generate an image of the surrounding environment. An image generated by the visible light camera 11 may hereinafter be referred to as the first image, and an image generated by the infrared camera 12 may hereinafter be referred to as a second image.

In some embodiments, the visible light camera 11 and the infrared camera 12 may capture the same scene. The first and second images are images of the same scene, where the first image may include visual information regarding the scene, and the second image may include temperature information regarding the scene. Pixel values in the first image may be used to visually represent the shape of each object included in the first image, and pixel values in the second image may be used to visually represent the temperature distribution of each object included in the second image. For example, if the pixel value at a first point in the second image is greater than the pixel value at a second point, it may be understood that the temperature is higher at the first point than that at the second point.

The visible light camera 11 and the infrared camera 12 may transmit the first and second images to the apparatus 13. FIG. 1 illustrates the visible light camera 11 and the infrared camera 12 as separate entities, but alternatively, in some embodiments, the visible light camera 11 and the infrared camera 12 may be combined into one entity. For example, a multifunctional camera that provides the functions of both the visible light camera 11 and the infrared camera 12 may be equipped with an image sensor capable of detecting visible light and an infrared sensor capable of detecting infrared. Thus, the multifunctional camera may individually generate and transmit first and second images, created by the image sensor and the infrared sensor, to the apparatus 13. The visible light camera 11 and the infrared camera 12 will hereinafter be described as being provided separately.

Referring to FIG. 2, first image 410 and second image 420 may be provided in the same size.

Since the visible light camera 11 and the infrared camera 12 capture the same scene, the first and second images 410 may contain information regarding the same object, i.e., an object 411. Information included in the first image 410 may be visual information regarding the shape of the object 411, and information included in the second image 420 may be visual information regarding the temperature distribution of the object 412.

The second image 420 may visually represent the object 412 based on temperature. For example, the second image 420 may display areas with relatively higher temperatures in brighter colors and areas with relatively lower temperatures in darker colors.

Since the first image 410 and second image 420 are of the same size, a particular point selected from one of the first image 410 and second image 420 and a corresponding point in the other image may be identified. Specifically, a user may select a point c1 in the first image 410. The point c1 may correspond to coordinates (x, y). In this case, a point c2, which corresponds to the coordinates (x, y) in the second image 420, may be extracted, and the temperature of the point c1 may be determined. In other words, when the user selects a particular point in the first image 410, a corresponding point in the second image 420 may be identified, and the temperature at the particular point may be determined based on the pixel value of the corresponding point in the second image 420.

By referencing the coordinate relationship between the first image 410 and second image 420, the apparatus 13 may identify and output the temperature of each point selected by the user.

The apparatus 13 may use the first image 410 and second image 420 to provide an edited image containing temperature information. For example, the apparatus 13 may provide an edited image that adds temperature information of a particular object to the first image 410, or an edited image that includes the second image 420. The user may determine the temperature distribution of the photographed scene using the edited image provided by the apparatus 13.

The apparatus 13 may transmit the edited image. The edited image may be delivered to the management server 14 through the communication network 16. The management server 14 may manage the edited image created by the apparatus 13. FIG. 1 illustrates the system 10 as including one apparatus 13, but alternatively, the system 10 may include a plurality of apparatuses 13. In this case, the management server 14 may manage a plurality of edited images from the respective apparatuses 13.

The monitoring device 15 may be connected to the management server 14 to receive an edited image and display the received edited image. The user may identify the temperature distribution of the photographed scene using the edited image displayed on the screen of the monitoring device 15.

The monitoring device 15 may access the apparatus 13 directly without passing through the communication network 16, or may be integrally formed with the apparatus 13 to output an edited image.

Additionally, FIG. 1 illustrates the apparatus 13 and the management server 14 as separate entities, but alternatively, the apparatus 13 may be provided within the management server 14. In this case, the first image 410 and second image 420, created by the visible light camera 11 and the infrared camera 12, may be transmitted to the management server 14 through the communication network 16, and the apparatus 13, provided within the management server 14, may generate an edited image using the first image 410 and second image 420.

The apparatus 13, the management server 14, and the monitoring device 15 will hereinafter be described as communicating with one another through the communication network 16.

Figure 3:
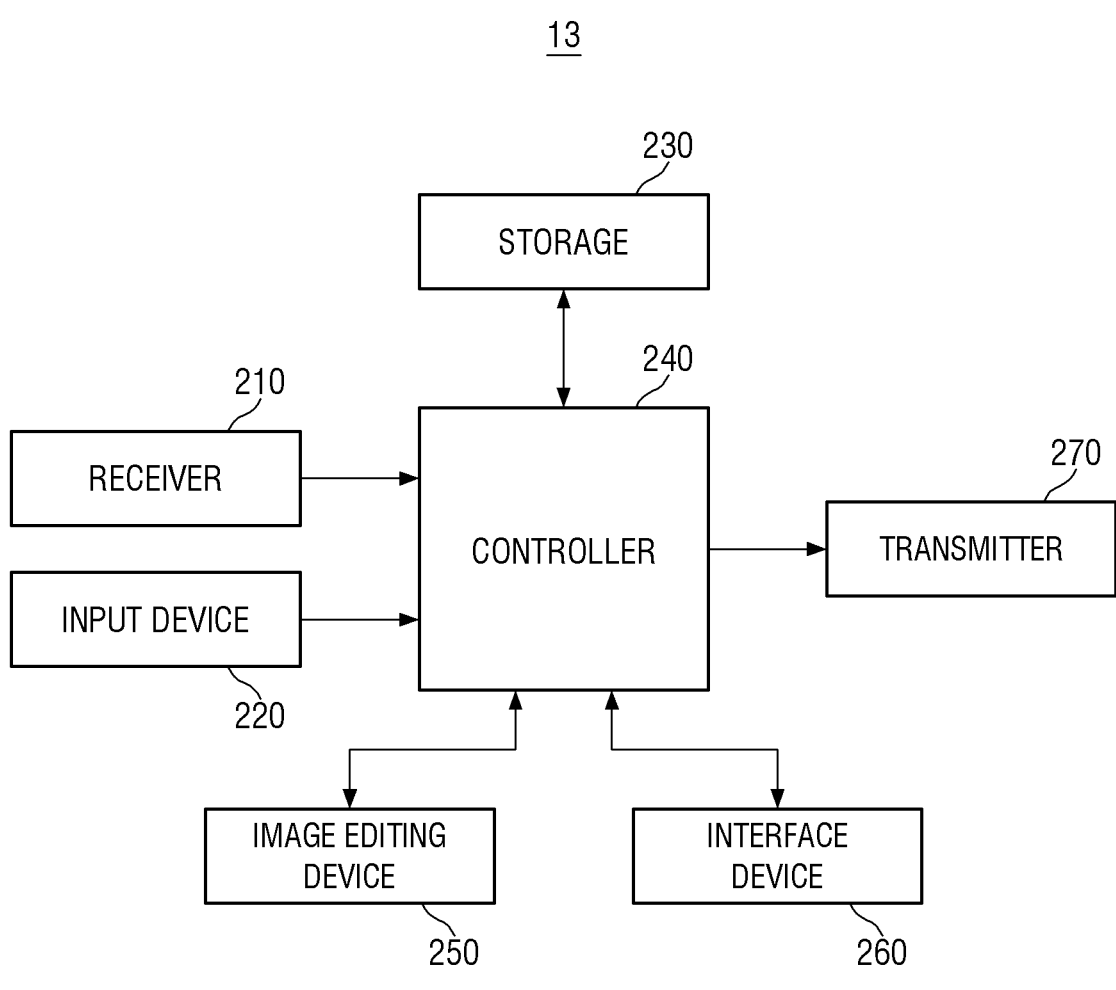
FIG. 3 is a block diagram of an apparatus for providing temperature information according to an embodiment.
Figure 4:
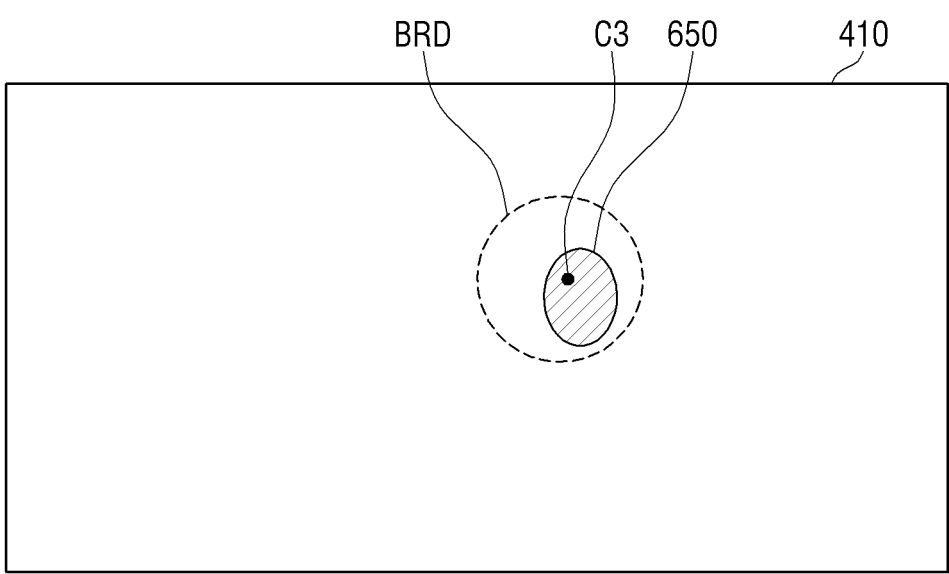
FIG. 4 is a diagram illustrating the setting of a reference area according to an embodiment.

FIG. 3 is a block diagram of an apparatus for providing temperature information according to an embodiment. FIG. 4 is a diagram illustrating the setting of a reference area according to an embodiment.

Referring to FIG. 3, the apparatus 13 may include a receiver 210, an input device 220, a storage 230, a controller 240, an image editing device 250, an interface device 260, and a transmitter 270.

The receiver 210 may receive the first image 410 and second image 420 of the same scene, respectively captured by the visible light camera 11 and the infrared camera 12. In some embodiments, the first image 410 and second image 420 may be still images or videos. To continuously receive still images or videos, the receiver 210 may maintain a continuous communication channel with the visible light camera 11 and the infrared camera 12.

The input device 220 may receive user commands. In some embodiments, the apparatus 13 may provide temperature information for a point selected by the user from the first image 410 or the second image 420. The input device 220 may receive a point selection command. Additionally, the input device 220 may also receive a color selection command that will be described later. Furthermore, the input device 220 may receive input for one of a general mode and a temperature information provision mode. Moreover, the input device 220 may receive various other user commands.

The user may input commands using an inputter such as a mouse, wheel, digital pen, keyboard, or button, and the input device 220 may receive signals generated by the inputter.

The storage 230 may temporarily or permanently store images received through the receiver 210. Additionally, the storage 230 may also temporarily or permanently store edited images created by the image editing device 250. Furthermore, the storage 230 may store image editing algorithms used by the image editing device 250 and data for an interface provided by the interface device 260.

The image editing device 250 may set a reference area for the object selected by the user by referring to the pixel values of the second image 420, and create an edited image with the reference area marked on the first image 410 or the second image 420. Specifically, the image editing device 250 may set a reference area with a predetermined range of temperatures around a target point selected by the user in the first image 410 or the second image 420, with reference to the pixel values of the second image 420, and mark the set reference area on the first image 410 or the second image 420.

Referring to FIG. 4, the user may select a particular point C3 in the first image 410 as a target point. When the target point C3 is selected, a boundary area BRD of a predetermined size may be set around the target point C3. If the boundary area BRD is circular, the boundary area BRD may have a predetermined radius around the target point C3. Alternatively, the boundary area BRD may be provided in the shape of a polygon, such as a triangle or a rectangle, encompassing the target point C3.

Once the boundary area BRD is set, the image editing device 250 may set a reference area 650 by grouping points in the second image 420 within the boundary area BRD with similar pixel values to that of the target point C3. If the reference area 650 is set, the image editing device 250 may fill the reference area 650 with a particular color. For example, the image editing device 250 may fill the reference area 650 with a color corresponding to the temperature of the reference area 650, among colors included in a temperature bar. Alternatively, the image editing device 250 may also mark the boundary of the reference area 650 with a bold line or a dotted line.

The boundary area BRD has been described as being set around the target point C3, and the reference area 650 has been described as being set within the range of the boundary area BRD. However, this is exemplary, and alternatively, the image editing device 250 may set the reference area 650 without setting the boundary area BRD. For example, the image editing device 250 may set the reference area 650 by grouping the target point C3 and other points directly or indirectly connected to the target point C3 and having similar pixel values to that of the target point C3. The setting of the reference area 650 within the range of the boundary area BRD will hereinafter be described.

When the user selects the target point C3 in the first image 410, the image editing device 250 may identify a corresponding point in the second image 420 and set the reference area 650 by referencing the pixel value of the corresponding point.

The interface device 260 may provide an interface to deliver user convenience information or to receive user convenience commands. As will be described later, the interface may include at least one of a temperature bar, a temperature change icon, and a color selection icon. The temperature bar, the temperature change icon, and the color selection icon will be described later in detail.

The transmitter 270 may transmit an edited image created by the image editing device 250 to the monitoring device 15. The monitoring device 15 may display the edited image received from the transmitter 270.

The controller 240 may perform overall control of the receiver 210, the input device 220, the storage 230, the image editing device 250, the interface device 260, and the transmitter 270.

Figure 5:
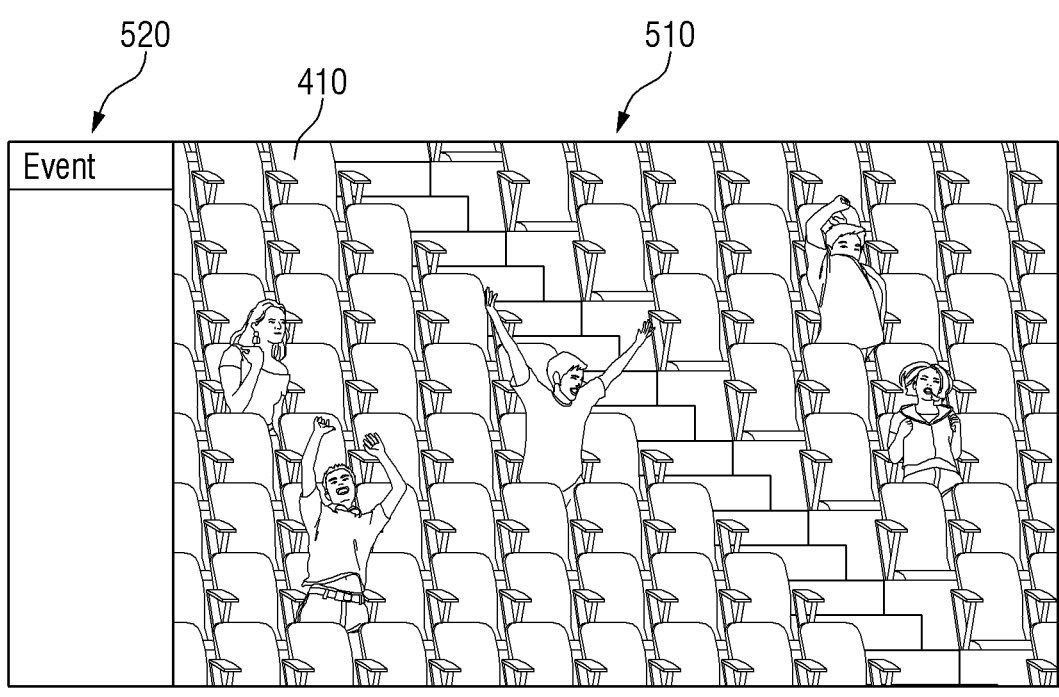
FIG. 5 is a diagram illustrating an edited image according to an embodiment.

FIG. 5 is a diagram illustrating an edited image according to an embodiment.

Referring to FIG. 5, an edited image 500 may include an image output area 510 and an event output area 520.

The image output area 510 may represent an area where the first image 410 may be displayed. The image editing device 250 may include the first image 410 in the image output area 510. The user may visually identify the photographed scene from the first image 410 included in the image output area 510.

The event output area 520 may represent an area where event information may be displayed. The event information may include information regarding objects whose temperature exceeds a threshold temperature. The image editing device 250 may include event information for a reference area with a temperature exceeding the threshold temperature in the event output area 520. The user may identify information regarding objects with temperatures exceeding the threshold temperature, among the objects included in the photographed scene, from the event information.

In some embodiments, the event information may include at least one of the location of an object corresponding to the reference area, the temperature of the reference area, and the time of measurement of the temperature of the reference area. The event information will be described later in detail with reference to FIG. 8.

The image editing device 250 may operate in the general mode or the temperature information provision mode to provide the edited image 500. FIG. 5 illustrates the edited image 500 in the general mode. In the general mode, the user may identify only information regarding the shape of the objects included in the photographed scene, and may not receive information regarding the temperature distribution of the objects. To receive the information regarding the temperature distribution of the objects, the user may switch the mode of the image editing device 250 to the temperature information provision mode.

Figure 6:
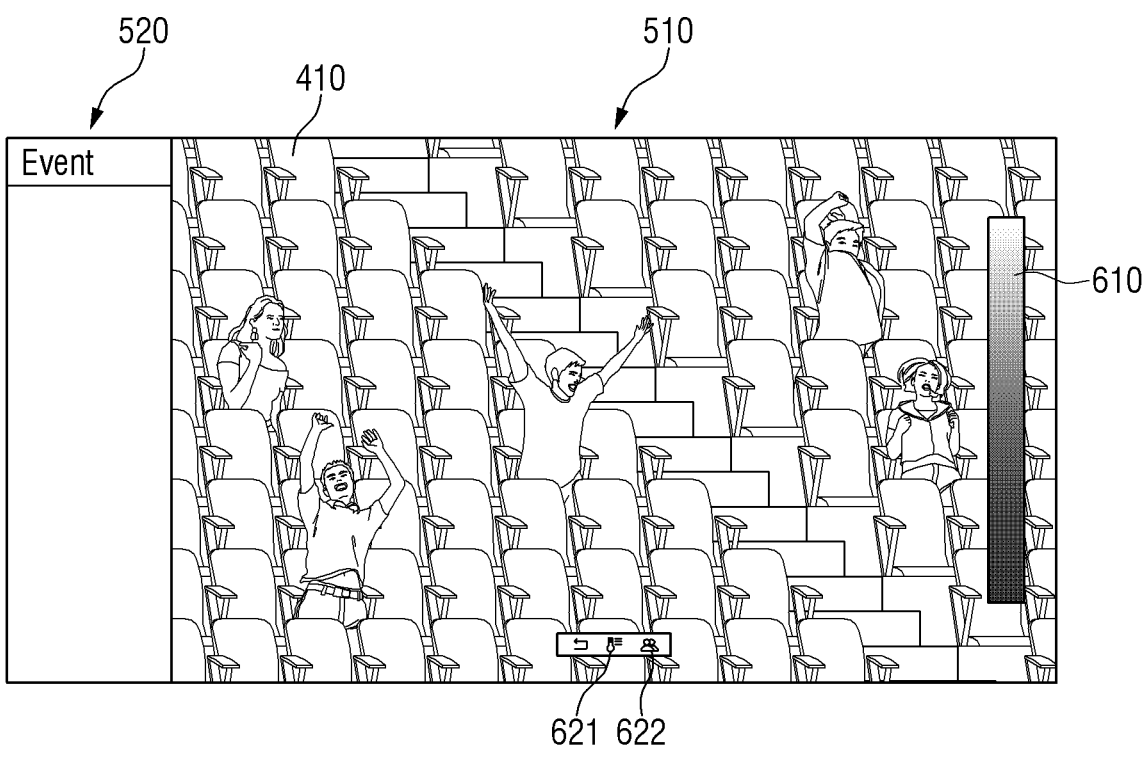
FIG. 6 is a diagram illustrating the edited image in the temperature information provision mode according to an embodiment.

FIG. 6 is a diagram illustrating the edited image in the temperature information provision mode according to an embodiment. Referring to FIG. 6, in the temperature information provision mode, the edited image 500 may include a temperature bar 610, a pointer icon 621, and a surrounding setting icon 622.

The interface device 260 may display a temperature bar 610 that visually represents the temperature range of the reference area. The temperature bar 610 may be provided in the form of an elongated bar. The colors at each end of the temperature bar 610 may be different, and the color of the temperature bar 610 may gradually change from one end to the other end of the temperature bar 610. For example, the color of the temperature bar 610 gradually changes from the color at one end to the color at the other end. Specifically, if the colors at one end and the other end are white and black, respectively, the color of the temperature bar 610 may gradually change from white to black in a direction from one end to the other of the temperature bar 610.

The temperature information provision mode may include an object selection mode and a surrounding area setting mode.

Figure 7:
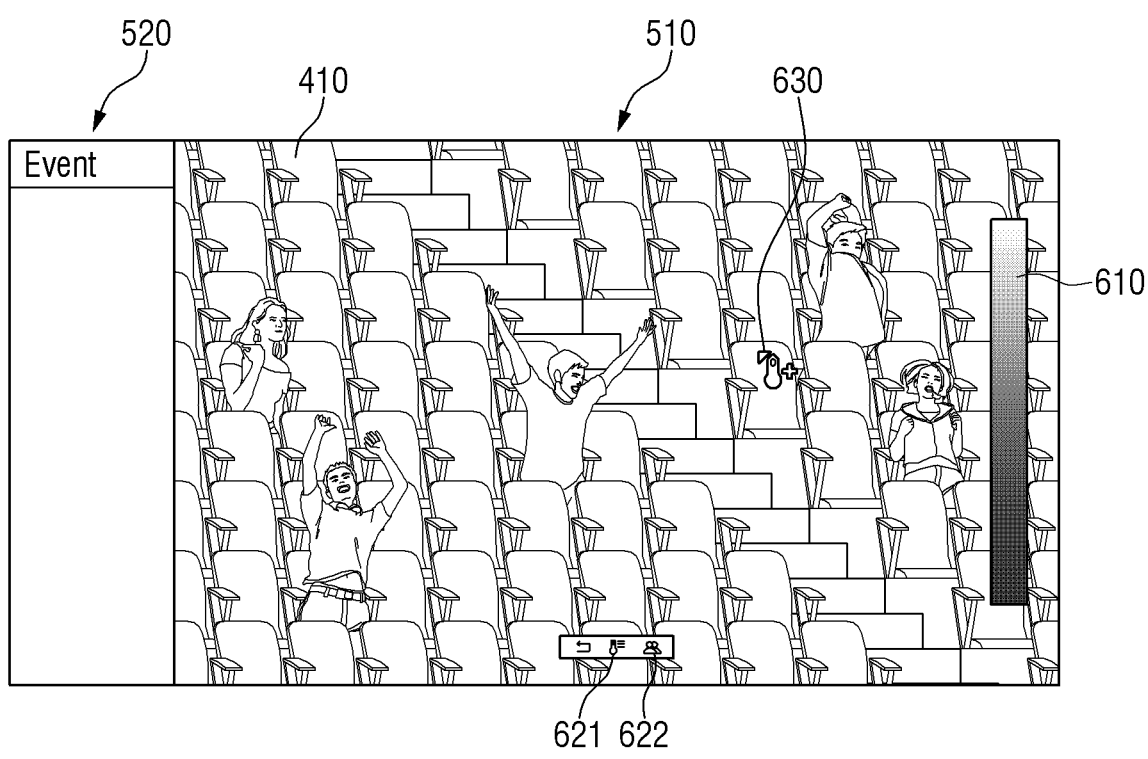
FIG. 7 is a diagram illustrating a pointer in an object selection mode according to an embodiment.

FIG. 7 is a diagram illustrating a pointer in an object selection mode according to an embodiment. Referring to FIG. 7, when the pointer icon 621 is selected, the temperature information provision mode may switch to the object selection mode.

In the object selection mode, the mouse pointer 630 may change to a unique shape. The user may identify that the current mode is the object selection mode from the shape of the mouse pointer 630.

In the object selection mode, the user may select a target object whose temperature needs to be checked. That is, the user may place the mouse pointer 630 over the target object and may input a check request command. The check request command may be input through the input device 220.

Figure 8:
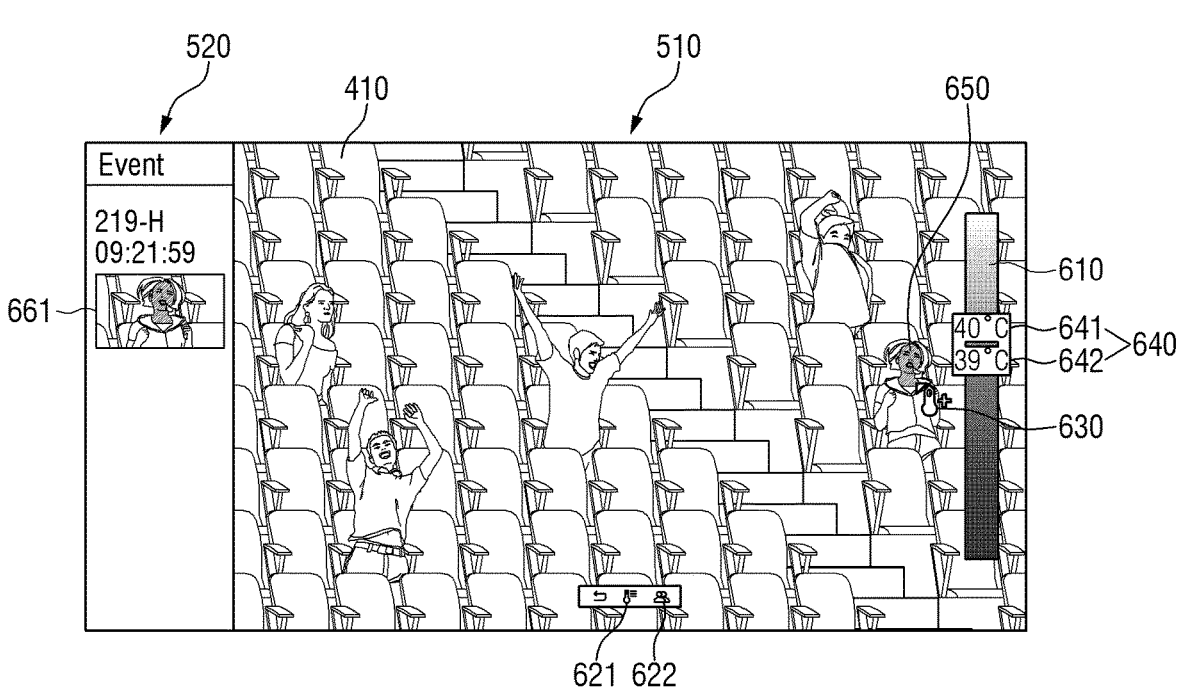
FIG. 8 is a diagram illustrating an object selected from the edited image according to an embodiment.

FIG. 8 is a diagram illustrating an object selected from the edited image according to an embodiment. Referring to FIG. 8, when the target object is selected, the image editing device 250 may determine the temperature of the target object.

The temperature of the target object may be determined by referencing the pixel value of the point in the second image 420 that corresponds to the point selected by the mouse pointer 630. If the temperature of the target object exceeds the threshold temperature, the image editing device 250 may include event information 661 for the target object in the event output area 520. The event information 661 may include at least one of the location of the target object, the temperature of the target object, and the time of measurement of the temperature of the target object. The temperature of the target object may represent the temperature of the reference area 650, set based on the target point selected by the mouse pointer 630. For example, the average temperature of the pixels in the reference area 650 may be provided as the temperature of the target object.

The location of the target object, included in the event information 661, may be the geographical coordinates of the point where the target object resides or may be artificial location information set in advance. For example, the location of the target object may be geographical coordinates based on a coordinate system such as the World Geodetic System (WGS) or the Geodetic Reference System (GRS). Alternatively, if the photographed scene is a spectator area of a sports stadium, the location of the target object may be the unique number of the spectator seat where the target object is located.

The user may select an object included in the first image 410 that they wish to check, and may determine whether the temperature of the selected object exceeds the threshold temperature.

Figure 9:
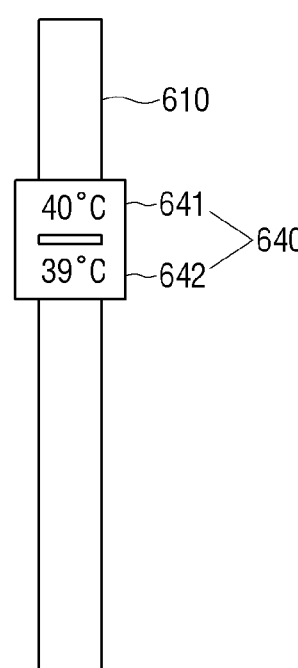
FIG. 9 is a diagram illustrating a temperature change icon on a temperature bar according to an embodiment.
Figure 10:
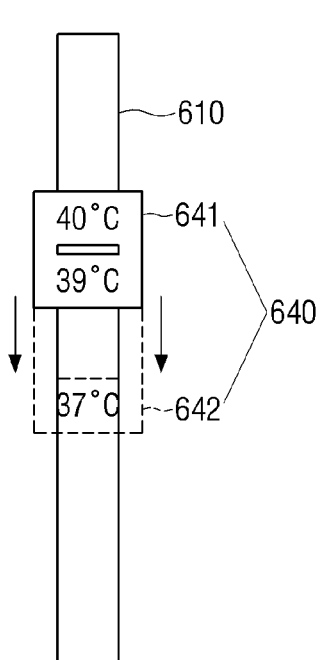
FIG. 10 is a diagram illustrating the functions of the temperature change icon according to an embodiment.

FIG. 9 is a diagram illustrating a temperature change icon on a temperature bar according to an embodiment. FIG. 10 is a diagram illustrating the functions of the temperature change icon according to an embodiment. Referring to FIGS. 8 through 10, when the target object is selected, the interface device 260 may place an icon (hereinafter, the temperature change icon) 640 near the temperature bar 610, allowing for the adjustment of upper and lower limit temperatures.

The temperature change icon 640 may include an upper limit change icon 641 and a lower limit change icon 642. The upper limit change icon 641 may be used to change the upper limit temperature, and the lower limit change icon 642 may be used to change the lower limit temperature. The user may use the mouse pointer 630 to drag the upper limit change icon 641 to change the upper limit temperature, and drag the lower limit change icon 642 to change the lower limit temperature. FIG. 10 illustrates the change of the lower limit temperature by moving the lower limit change icon 642.

The upper limit change icon 641 and the lower limit change icon 642 may display the upper and lower limit temperatures, respectively. The temperature displayed upon the selection of the target object may be the temperature of the target object. For example, a highest temperature among the temperatures of the pixels in the reference area 650 may be displayed on the upper limit change icon 641, and a lowest temperature among the temperatures of the pixels in the reference area 650 may be displayed on the lower limit change icon 642.

In some embodiments, the upper and lower limit temperatures may be temperatures that provide selection criteria for other objects than that selected by the user. For example, other objects with temperatures within the range of the upper and lower limit temperatures may be included in the first image 410. Objects other than that selected by the user may hereinafter be referred to as surrounding objects.

Figure 11:
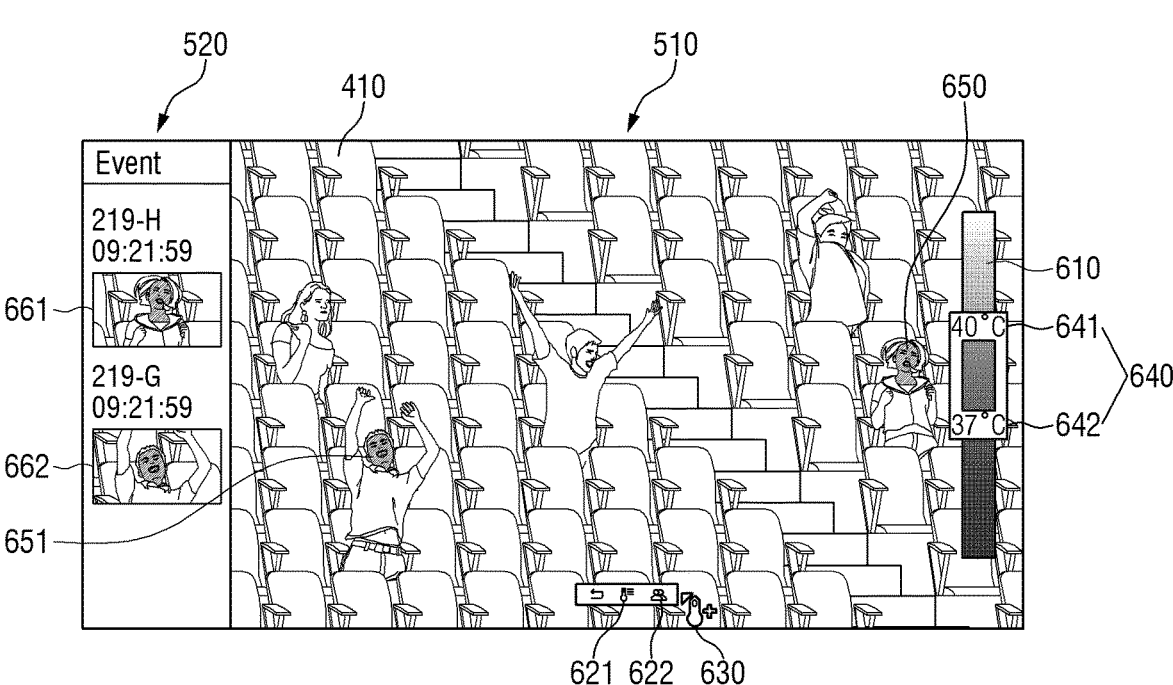
FIG. 11 is a diagram illustrating the display of a surrounding reference area in the edited image according to an embodiment.

FIG. 11 is a diagram illustrating the display of a surrounding reference area in the edited image according to an embodiment. Referring to FIG. 11, the image editing device 250 may display a surrounding reference area 651 in the first image 410.

The image editing device 250 may identify surrounding objects with temperatures within the range of the upper and lower limit temperatures, and display the surrounding reference area 651 for the surrounding objects in the first image 410.

The user may use the upper limit change icon 641 and the lower limit change icon 642 to adjust the upper and lower limit temperatures. If the upper and/or lower limit temperatures changes, the temperature range for selecting surrounding objects may also change. The user may select the surrounding setting icon 622 to identify surrounding objects with temperatures within the range of the upper and lower limit temperatures. The image editing device 250 may then identify the surrounding objects with temperatures within the range of the upper and lower limit temperatures, and set the surrounding reference area 651 for the identified surrounding objects. The setting of the surrounding reference area 651 may be performed in the same manner as the setting of the reference area 650, as illustrated in FIG. 4.

Furthermore, the image editing device 250 may include event information 662 for the surrounding reference area 651 that exceeds the threshold temperature in the event output area 520. The event information 662 may include at least one of the location of each surrounding object, the temperature of each surrounding object, and the time of measurement of the temperature of each surrounding object.

When the user chooses the target object whose temperature is to be checked, a reference temperature range for the image output area 510 may be set. For example, the actual temperature of each object included in the image output area 510 and the temperature of a corresponding object identified by the image editing device 250 may differ. In some embodiments, the temperature of the object selected by the user is used as a reference to determine the temperature of other objects, allowing for compensation of any discrepancy between the actual temperature of each object and the temperature identified by the image editing device 250.

With such temperature discrepancy compensated, the user may set a temperature range by changing the upper and lower limit temperatures and may thus easily identify each object in the photographed scene that has temperatures within the range of the upper and lower limit temperatures.

The identification and display of the temperature range for a single object in response to the selection of a target point by the user has been described so far, but alternatively, in some embodiments, the user may select an area of a particular range. That is, the image editing device 250 may set at least one reference area with a predetermined range of temperatures based on the target area selected by the user in the first image 410 or the second image 420, and display the at least one reference area in the first image 410 or the second image 420. In this case, the image editing device 250 may identify the temperature of the reference area for at least one object included in the target area, and the interface device 260 may create a temperature change icon 640 based on the identified temperature. The upper limit change icon 641 and the lower limit change icon 642 included in the temperature change icon 640 may display the upper and lower limit temperatures of the at least one reference area included in the target area selected by the user. The identification of the temperature range of a single object in response to the selection of a single target point by the user will hereinafter be described.

Figure 12:
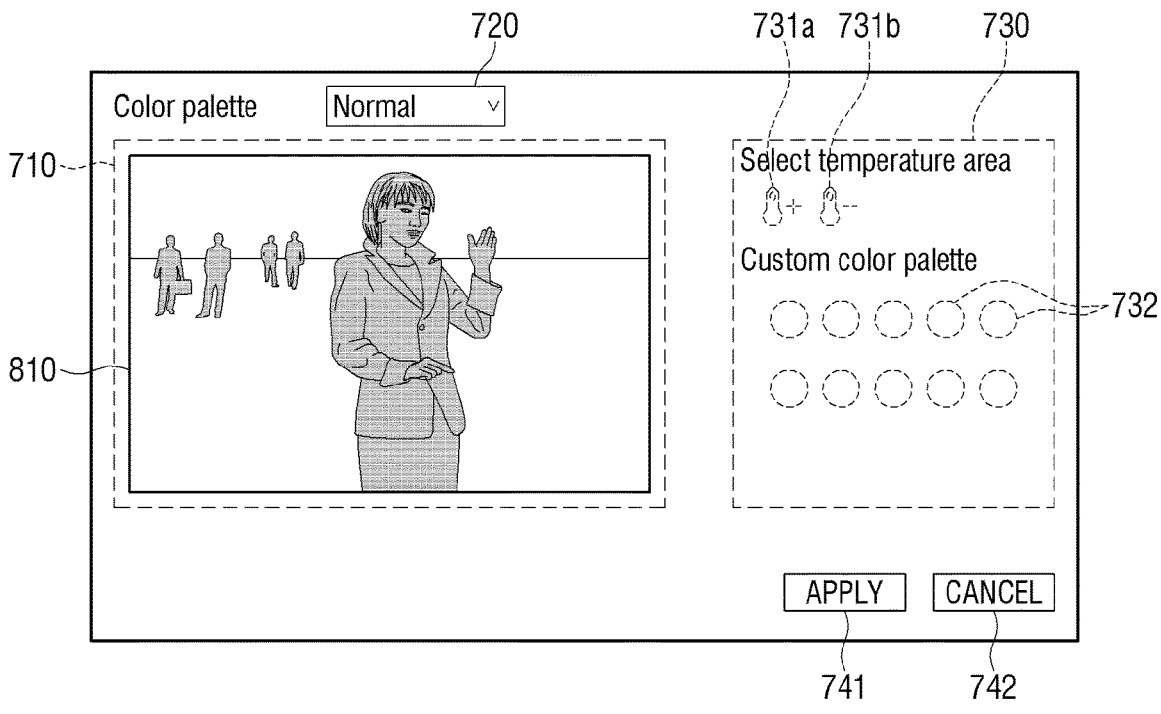
FIG. 12 is a diagram illustrating an edited image for selecting the color of a temperature bar according to an embodiment.

FIG. 12 is a diagram illustrating an edited image for selecting the color of a temperature bar according to an embodiment.

Referring to FIG. 12, an edited image 700 for selecting the color of a temperature bar may include an image output area 710, a color selection button 720, a custom area 730, an apply button 741, and a cancel button 742.

The image output area 710 may be an area where either a first image 810 or a second image 420 may be displayed. The image editing device 250 may include either the first image 810 or the second image 420 in the image output area 710. A user may visually verify the photographed scene by referring to the first image 810 or the second image 420 included in the image output area 710.

Figure 13:
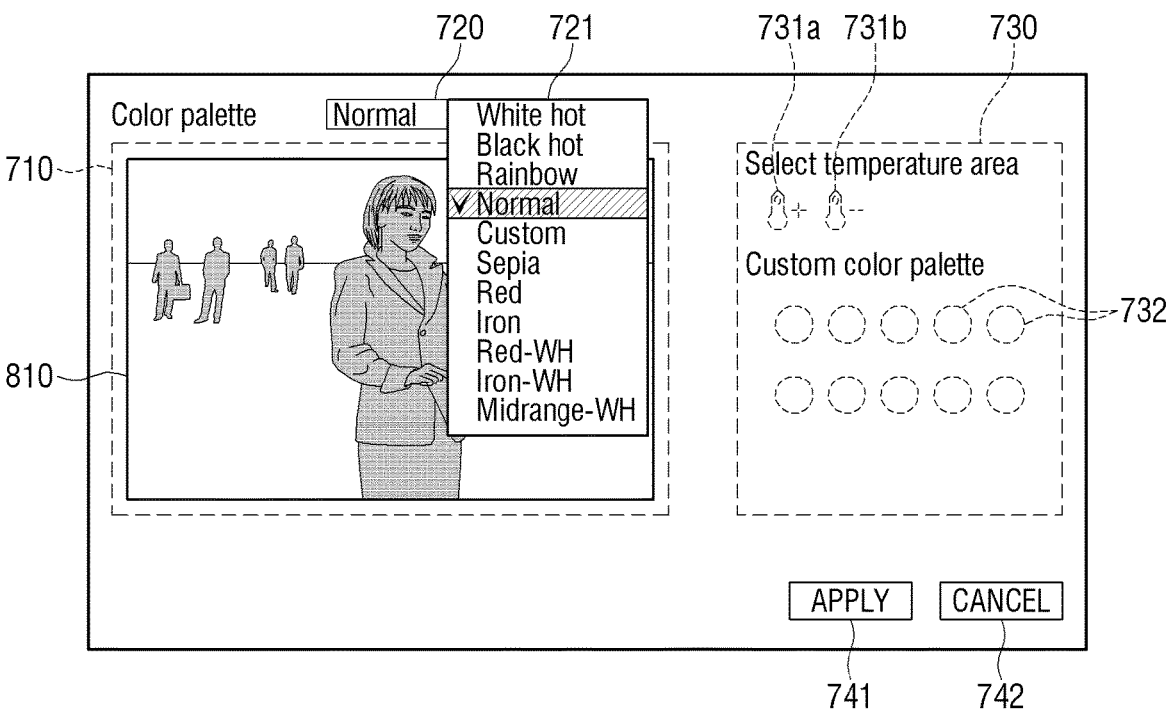
FIG. 13 is a diagram illustrating a displayed color list according to an embodiment.

The color selection button 720 may indicate a currently selected color and may be used to display a color list 721 (refer to FIG. 13). For example, the color selection button 720 may be provided in the form of a combo box. When the user selects the color selection button 720 with a mouse pointer, the color list 721 may be displayed. The user may select their desired color from the color list 721.

The color selected via the color selection button 720 may be used to represent the second image 420 displayed through the image output area 710. The scene included in the second image 420 may be represented in the color selected via the color selection button 720.

The custom area 730 may include temperature icons 731a and 731b and custom color icons 732. The temperature icons 731a and 731b may include an upper limit temperature icon 731a and a lower limit temperature icon 731b. The upper limit temperature icon 731a may be used to determine the color for an upper limit temperature among custom colors. The lower limit temperature icon 731b may be used to determine the color for a lower limit temperature among the custom colors. If the upper limit temperature icon 731a is selected by the user and then a custom color icon 732 is selected, the color of the selected custom color icon 732 may be determined as the color for the upper limit temperature. Similarly, if the lower limit temperature icon 731b is selected by the user and then a custom color icon 732 is selected, the color of the selected custom color icon 732 may be determined as the color for the lower limit temperature. For example, the user may determine the upper limit temperature as red and the lower limit temperature as blue.

The custom color icons 732 may be used for the user to select from among the custom colors. A plurality of custom color icons 732 may be provided. The plurality of custom color icons 732 may be displayed in different colors. The user may select one of the plurality of custom color icons 732. When a custom color is selected, the second image 420 may be represented by the selected custom color.

In some embodiments, the custom area 730 may switch between an active state and an inactive state. When an item in the color list 721 is selected as a "Custom" item, the custom area 730 may switch to the active state. Conversely, if an item other than "Custom" is selected from the color list 721, the custom area 730 may switch to the inactive state. In the active state, the user may select the temperature icons 731a and 731b or the custom color icons 732. However, in the inactive state, the user may not be able to select the temperature icons 731a and 731b or the custom color icons 732.

The apply button 741 may receive a user command to finally apply selections made in the color selection button 720 and the custom area 730. If the user selects the apply button 741, the selections made in the color selection button 720 and the custom area 730 are applied, and an image with the applied selections may be displayed through the image output area 710. On the other hand, if the cancel button 742 is selected, any selections made in the color selection button 720 and the custom area 730 may be canceled.

Figure 14:
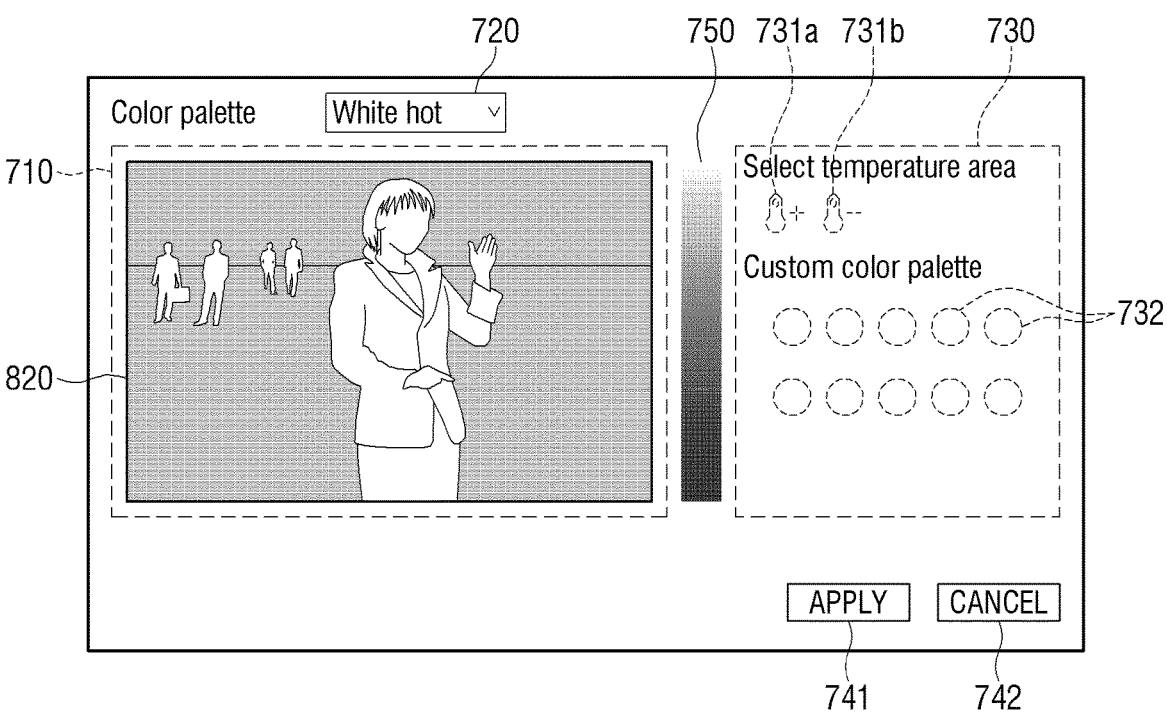
FIG. 14 is a diagram illustrating a second image displayed based on a color selected from the color list according to an embodiment.

FIG. 13 is a diagram illustrating a displayed color list according to an embodiment. FIG. 14 is a diagram illustrating a second image displayed based on a color selected from the color list according to an embodiment.

Referring to FIG. 13, the user may use the color selection button 720 to display the color list 721.

The interface device 260 may display the color list 721 for selecting a base color to represent the second image 420. The color list 721 may include a plurality of colors. When one of the colors in the color list 721 is selected, the image displayed through the image output area 710 may be represented in the selected color. For example, FIG. 13 illustrates that a "Normal" item is selected from the color list 721. In this example, the first image 810 may be displayed in the image output area 710. Conversely, as illustrated in FIG. 14, if a "White hot" item is selected from the color list 721, the second image 820 with high-temperature points displayed in white and low-temperature points in black may be displayed through the image output area 710. In other words, the high-temperature points in the second image 820 may be represented in white, and the color may gradually change to black, moving from the upper limit temperature to the lower limit temperature. The user may refer to the second image 820 displayed through the image output area 710 to check the temperature distribution of the photographed scene.

When the second image 820 is displayed through the image output area 710, a temperature bar 750 may be displayed in the edited image 700. The interface device 260 may display a temperature bar 750 that visually represents the temperature range of the second image 820. The temperature bar 750 may display the temperature range from the upper limit to the lower limit temperature using colors. The temperature bar 750 may be displayed in colors corresponding to a color item selected from the color list 721. For example, if the "White hot" item is selected from the color list 721, the temperature bar 750 may be represented in colors that change gradually from white for the upper limit temperature to black, moving from the upper limit temperature toward the lower limit temperature. Alternatively, if a "Black hot" item is selected from the color list 721, the temperature bar 750 may be represented in colors that gradually change from black for the upper limit temperature to white, moving from the upper limit temperature toward the lower limit temperature.

Figure 15:
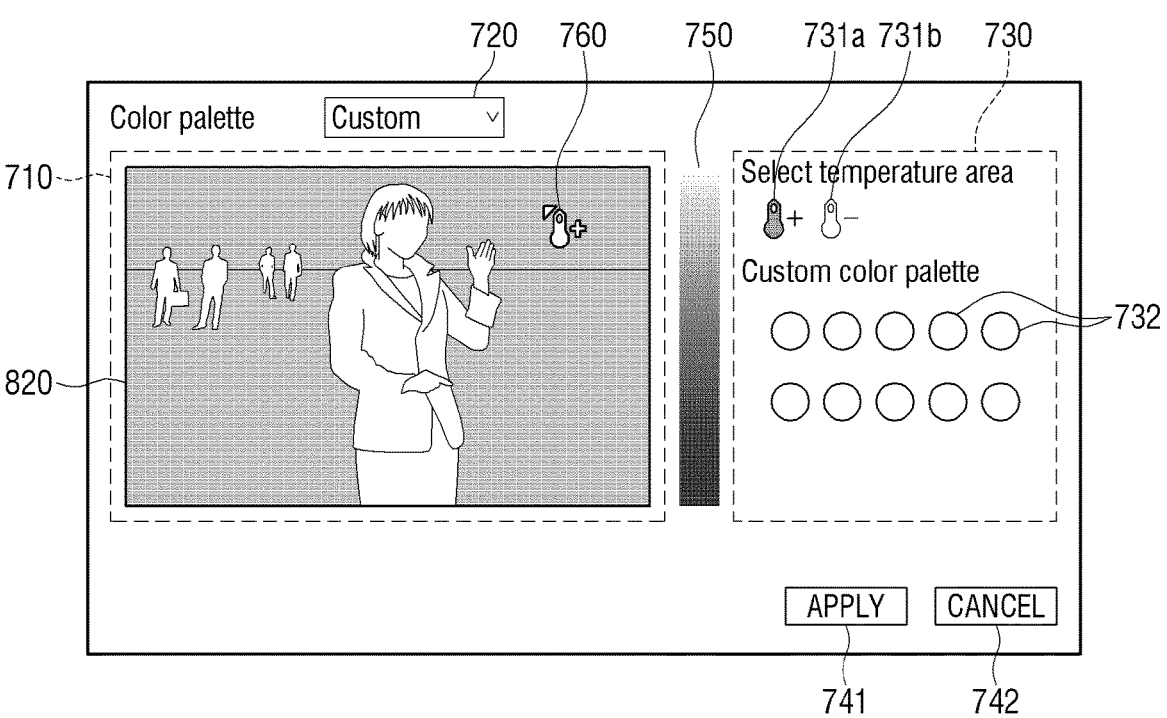
FIG. 15 is a diagram illustrating a custom color selected from the color list according to an embodiment.

FIG. 15 is a diagram illustrating a custom color selected from the color list according to an embodiment.

Referring to FIG. 15, when a custom color item is selected from the color list 721, the interface device 260 may activate icons (i.e., the custom color icons 732) for selecting custom colors.

As the custom area 730 is activated, the user may select the temperature icons 731*a* and 731*b* and the custom color icons 732. Additionally, when the custom area 730 is activated, a mouse pointer 760 may change to a unique shape corresponding to the upper limit temperature icon 731*a* or the lower limit temperature icon 731*b*.

Figure 16:
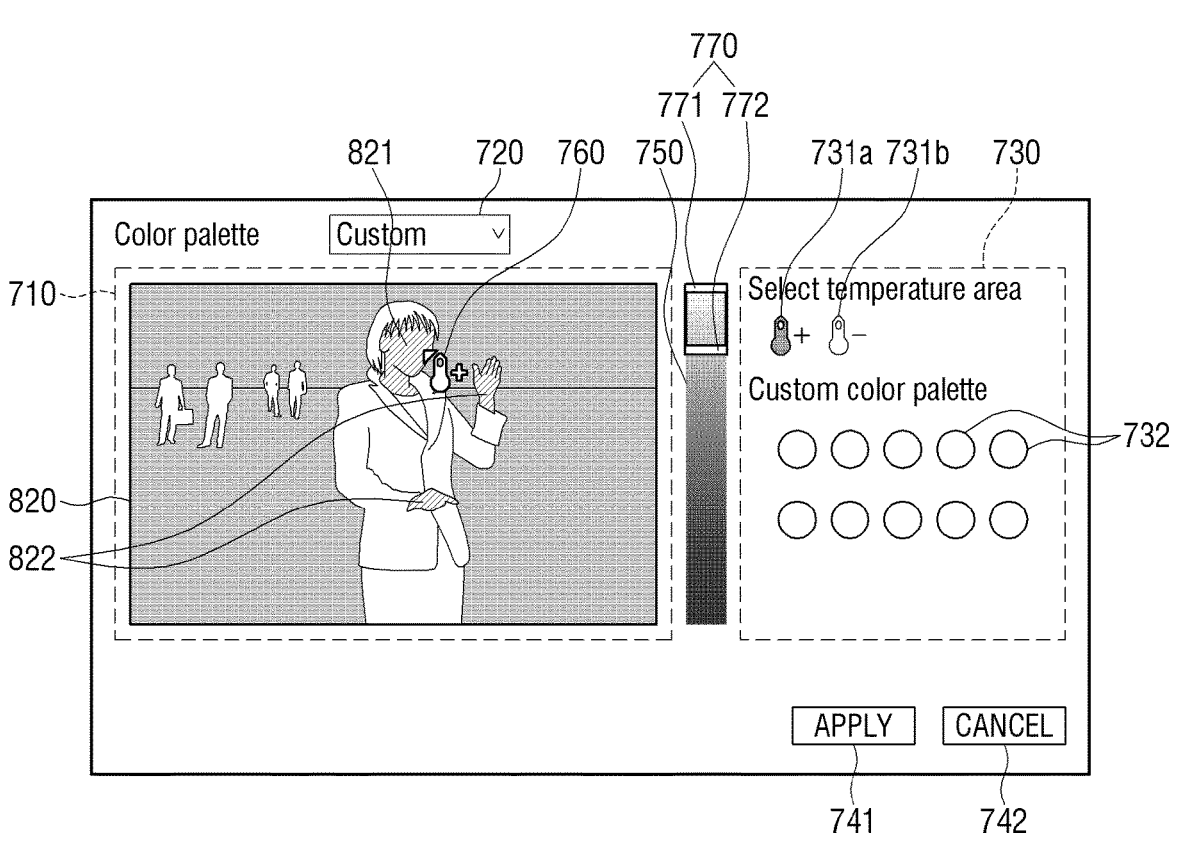
FIG. 16 is a diagram illustrating a target point being selected according to an embodiment.

FIG. 16 is a diagram illustrating a target point being selected according to an embodiment. Referring to FIG. 16, a particular point within the second image 820 may be selected for choosing the color of the temperature bar 750.

When a particular point in the second image 820 is selected by the user, a reference area 821 is set accordingly and may be visually indicated. For example, the image editing device 250 may fill the reference area 821 with a particular color or mark the boundary of the reference area 821 with a bold line or a dotted line.

Once the reference area 821 is set, temperature change icons 770 may be disposed on the temperature bar 750. The temperature change icons 770 may include an upper limit change icon 771 and a lower limit change icon 772. The upper limit change icon 771 may be used for changing the upper limit temperature, and the lower limit change icon 772 may be used for changing the lower limit temperature.

Furthermore, when a target point is selected by the user, the upper limit change icon 771 and the lower limit change icon 772 may be used to indicate the temperature range of the reference area 821. For example, if a highest pixel temperature in the reference area 821 is "a" and a lowest pixel temperature in the reference area 821 is "b", the upper limit change icon 771 may be positioned at a point corresponding to "a" on the temperature bar 750, and the lower limit change icon 772 may be positioned at a point corresponding to "b" on the temperature bar 750.

Additionally, the image editing device 250 may visually display not only the reference area 821 corresponding to the target point selected by the user but also other areas 822 that fall within the temperature range formed by the upper limit change icon 771 and the lower limit change icon 772.

Figure 17:
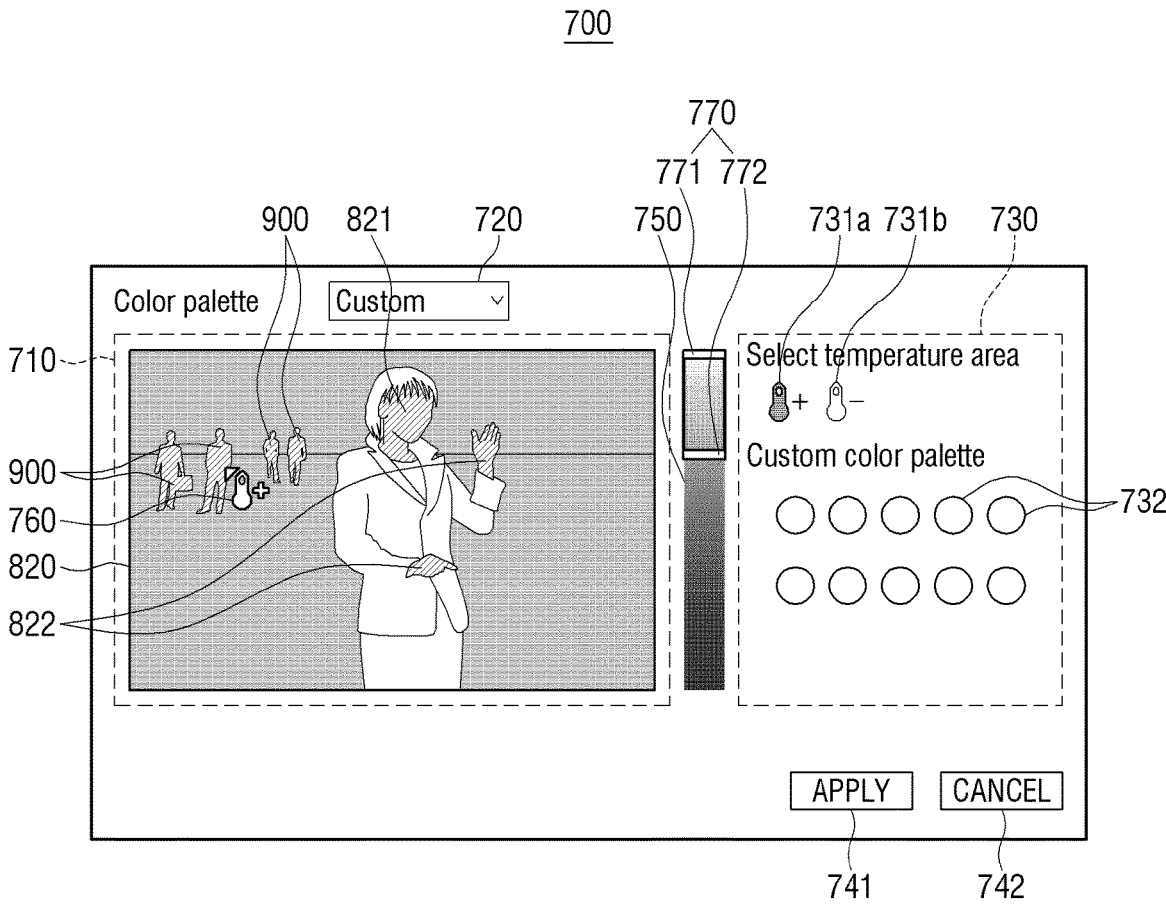
FIG. 17 is a diagram illustrating the adjustment of a temperature range according to an embodiment.

FIG. 17 is a diagram illustrating the adjustment of a temperature range according to an embodiment. Referring to FIG. 17, the user may use the upper limit change icon 771 and the lower limit change icon 772 to change the temperature range for selecting surrounding objects.

FIG. 17 illustrates the expansion of the temperature range for selecting surrounding objects in response to the adjustment of the lower limit change icon 772. As the temperature range is expanded, a surrounding reference area 900, previously not displayed before the expansion, may be set and displayed. The user may adjust the temperature interval of the temperature bar 750 to their desired range.

Figure 18:
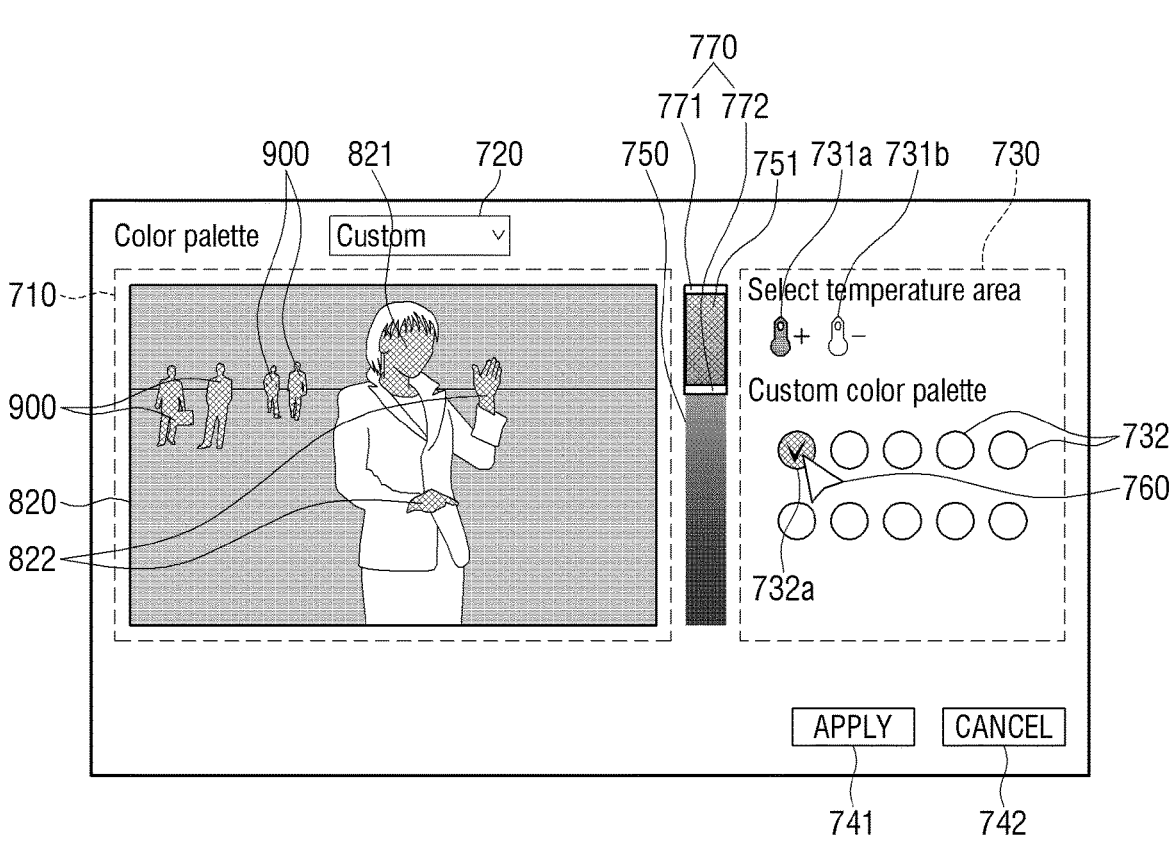
FIG. 18 is a diagram illustrating a custom color being selected according to an embodiment.

FIG. 18 is a diagram illustrating a custom color being selected according to an embodiment. Referring to FIG. 18, the user may select a custom color for the temperature range the user has set on the temperature bar 750.

The user may select a custom color icon 732*a* with a desired color from among the custom color icons 732. For example, using the mouse pointer 760, the user may select a custom color icon 732*a* with a red color. The interface device 260 may change a selected temperature interval 751 of the temperature bar 750 to the custom color selected by the user. In other words, the interface device 260 may represent the temperature interval 751 of the temperature bar 750, which falls within the temperature range between the upper limit change icon 771 and the lower limit change icon 772, in red. Since the custom color is selected while the upper limit temperature icon 731*a* is selected, the selected custom color may correspond to the color of the upper limit temperature. Thus, higher temperatures in the temperature interval 751 of the temperature bar 750 within the range of the upper limit change icon 771 and the lower limit change icon 772 may be represented in red, and as the temperature decreases, the color may gradually change to that corresponding to the lower limit temperature of the temperature bar 750.

Additionally, when a custom color is selected, portions of the second image 820 that fall within the temperature range between the upper limit change icon 771 and the lower limit change icon 772 may be represented in the selected custom color. Referring to FIG. 18, the reference area 821 and the surrounding reference area 900 may be represented in the selected custom color (e.g., in red). That is, the hottest parts of the reference area 821 and the surrounding reference area 900 may be represented in red, and as the temperature decreases, the color may gradually change to the color corresponding to the lower limit temperature of the temperature bar 750.

Figure 19:
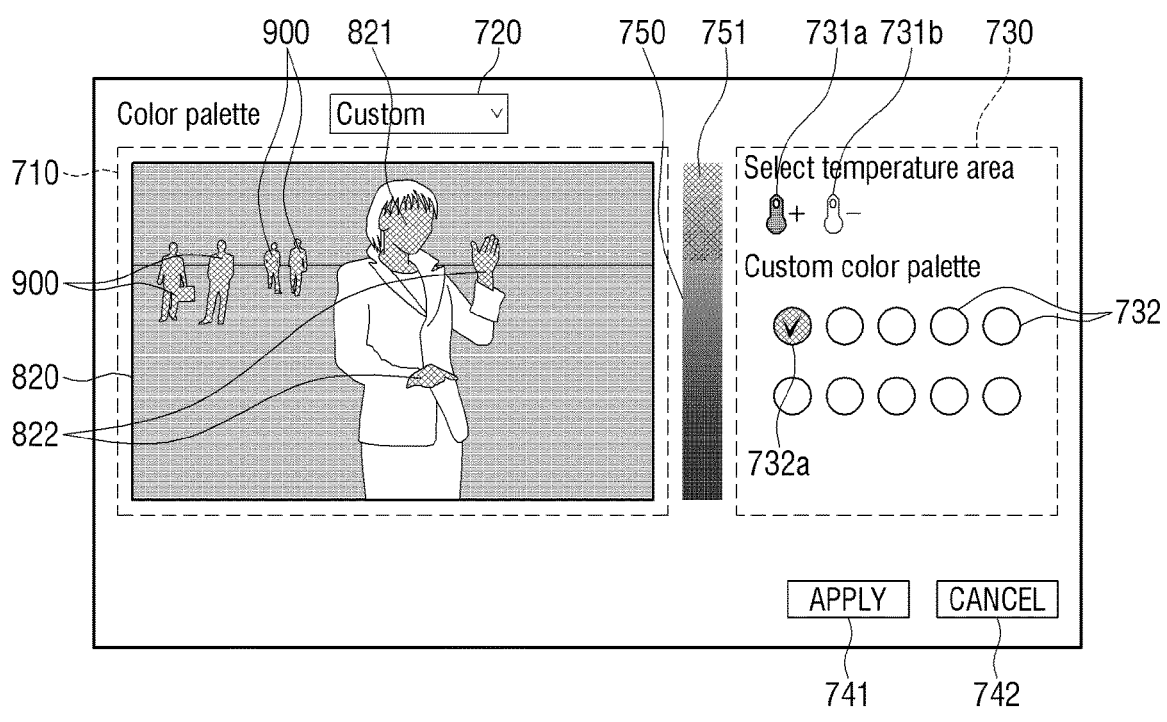
FIG. 19 is a diagram illustrating the application of the custom color according to an embodiment.

FIG. 19 is a diagram illustrating the application of the custom color according to an embodiment. Referring to FIG. 19, the user may use the apply button 741 to finalize selections made with the color selection button 720 and the custom area 730.

Once the selections made with the color selection button 720 and the custom area 730 are applied, an image with the applied selections may then be displayed in the image output area 710. In other words, the second image 820 within the temperature interval 751 of the temperature bar 750, which belongs to the temperature range between the upper limit temperature icon 731*a* and the lower limit temperature icon 731*b*, may be represented in the color previously selected from the color list 721. For example, if the "White hot" item is initially selected from the color list 721 and then a red custom color is selected, parts of the second image 820 within the temperature range between the upper limit temperature icon 731*a* and the lower limit temperature icon 731*b* may be represented based on the red color, while parts of the second image 820 within the remaining temperature range may be represented in the color corresponding to "White hot."

FIG. 19 illustrates that a portion of the entire temperature interval of the temperature bar 750 is set in a custom color, but alternatively, in some embodiments, a plurality of temperature intervals may be set in custom colors. For example, first, second, and third intervals on the temperature bar 750 may be set in red, blue, and green custom colors, respectively. Additionally, the custom color icons 732 may include an icon that allows the user to input a selection for a combinable color. For example, when this icon is selected, the user may choose a combination of red, blue, and green as a custom color.

Figure 20:
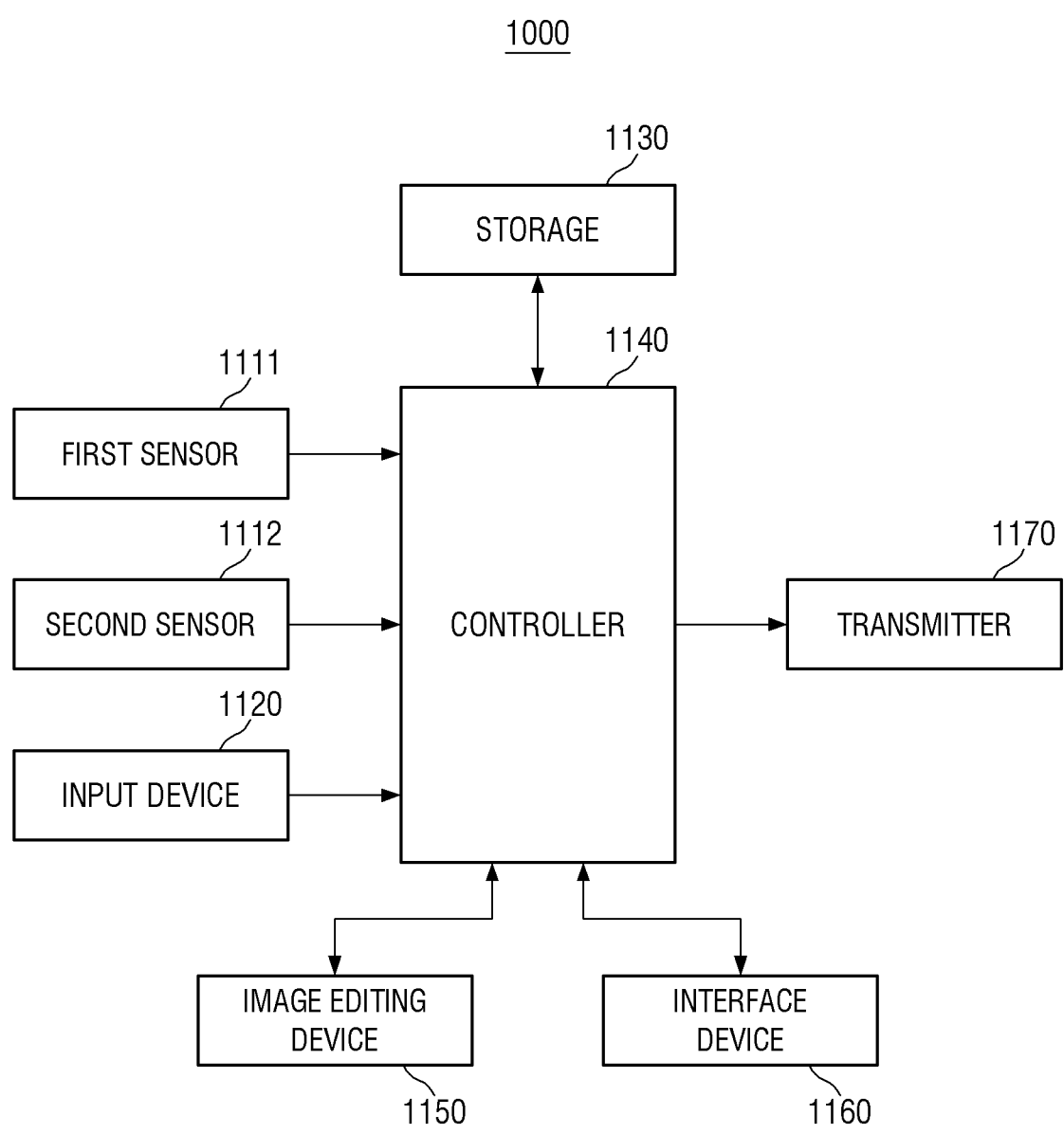
FIG. 20 is a block diagram of an apparatus for providing temperature information according to an embodiment.

FIG. 20 is a block diagram of an apparatus for providing temperature information according to an embodiment.

Referring to FIG. 20, an apparatus 1000 for providing temperature information according to some embodiments may include a first sensor 1111, a second sensor 1112, an input device 1120, a storage 1130, a controller 1140, an image editing device 1150, an interface device 1160, and a transmitter 1170.

The functions of the input device 1120, storage 1130, controller 1140, image editing device 1150, interface device 1160, and transmitter 1170 may be identical or similar to the functions of the previously described input device 220, storage 230, controller 240, image editing device 250, interface device 260, and transmitter 270, and thus, detailed descriptions thereof may be omitted.

The first sensor 1111 may detect visible light of a scene in front to create a first image 410, and the second sensor 1112 may detect infrared light of the scene to create a second image 420. The first sensor 1111 may create the first image 410 of the same scene, and the second sensor 1112 may create the second image 420 of the same scene. The first sensor 1111 may use a charge-coupled device (CCD) or a complementary metal-oxide semiconductor (CMOS) sensor to receive light reflected by each subject and convert the received light into an electrical signal. Additionally, the second sensor 1112 may be an infrared ray (IR) sensor that detects light in the infrared wavelength range.

Unlike the apparatus 13 that receives the first image 410 and second image 420 from separate visible light and infrared cameras, the apparatus 1000 may internally include the first sensor 1111 and the second sensor 1112 that create the first image 410 and second image 420. Therefore, simply installing the apparatus 1000 at a particular location may facilitate the checking of temperatures of objects included in the scene in front.

According to the aforementioned apparatus and method of the present invention, since temperature information including the temperature of an object is provided through a screen, a user may easily check the temperature of the object.

Additionally, since the provided temperature information may be modified at the user's convenience, the user may check the temperature of the object through their own screen configuration.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including, but not limited to, FIGS. 1, 3 and 20 may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. An apparatus for providing temperature information, comprising:
   a receiver configured to receive a first image and a second image of a same scene, the first image being captured by a visible light camera and the second image being captured by an infrared camera;
   an image editing device configured to:
      receive, from a user, a selection of an object on the first image or the second image;
      set a reference area for the object selected by the user based on pixel values in the second image; and
      generate an edited image that displays the first image or the second image with the reference area visually indicated therein; and
   a transmitter configured to transmit the edited image.

2. The apparatus of claim 1, wherein the image editing device is configured to set the reference area with a predetermined range of temperatures around a target point selected by the user in the first image or the second image, based on the pixel values in the second image, and
   wherein the image editing device is further configured to display the reference area in the first image or the second image.

3. The apparatus of claim 1, wherein the image editing device is configured to set the reference area by setting at least one reference area with a predetermined range of temperatures corresponding to a target area selected by the user in the first image or the second image, based on the pixel values in the second image, and
   wherein the image editing device is further configured to display the at least one reference area in the first image or the second image.

4. The apparatus of claim 1, wherein the edited image comprises an image output area and an event output area, and
   wherein the image editing device is further configured to:
      include the first image in the image output area; and,
      based on a temperature of the reference area exceeding a predetermined threshold temperature, include event information for the reference area in the event output area.

5. The apparatus of claim 4, wherein the event information comprises at least one of a location of an object corresponding to the reference area, the temperature of the reference area, and a time of measurement of the temperature of the reference area.

6. The apparatus of claim 1, further comprising:
   an interface device configured to provide an interface, the interface configured to provide user convenience information or receive user convenience commands.

7. The apparatus of claim 6, wherein the interface device is further configured to:
   display a temperature bar that visually represents a temperature range of the reference area; and
   position an icon enabling an adjustment of an upper limit temperature and a lower limit temperature.

8. The apparatus of claim 7, wherein the image editing device is further configured to:

identify at least one surrounding object with temperatures within a range between the upper limit temperature and the lower limit temperature; and
   display at least one surrounding reference area for the at least one surrounding object in the first image.

9. The apparatus of claim 8, wherein the image editing device is configured to provide event information in an event output area for at least one reference area that exceeds a predetermined threshold temperature.

10. The apparatus of claim 6, wherein the interface device is further configured to display a color list for selecting a reference color that represents the second image.

11. The apparatus of claim 10, wherein the interface device is further configured to, based on a custom color item being selected from the color list, activate an icon for selecting a custom color.

12. The apparatus of claim 11, wherein the interface device is further configured to:
   display a temperature bar that visually represents a temperature range of the second image; and
   change a temperature interval selected by the user from the temperature bar to the custom color selected by the user.

13. The apparatus of claim 12, wherein the image editing device is further configured to display an area in the second image within a temperature range selected by the user in the custom color selected by the user.

14. An apparatus for providing temperature information, comprising:
   a first sensor configured to generate a first image by detecting visible light from a scene;
   a second sensor configured to generate a second image by detecting infrared light from the scene;
   an image editing device configured to:
      receive, from a user, a selection of an object on the first image or the second image;
      set a reference area for the object selected by the user based on pixel values in the second image; and
      generate an edited image that displays the first image or the second image with the reference area visually indicated therein; and
   a transmitter configured to transmit the edited image.

15. A system for providing temperature information, comprising:
   an apparatus configured to provide temperature information, and to generate an edited image comprising temperature information for an object selected by a user;
   a management server configured to receive and store the edited image; and
   a monitoring device configured to receive the edited image by accessing the management server, and to output the edited image received from the management server,
   wherein the apparatus comprises:
      a receiver configured to receive a first image and a second image of a same scene, the first image being captured by a visible light camera and the second image being captured by an infrared camera;
      an image editing device configured to:
         receive, from a user, a selection of an object on the first image or the second image;
         set a reference area for the object selected by the user based on pixel values in the second image; and
         generate an edited image that displays the first image or the second image with the reference area visually indicated therein; and
      a transmitter configured to transmit the edited image.

16. A method of providing temperature information, comprising:

receiving a first image and a second image of a same scene, the first image being captured by a visible light camera and the second image being captured by an infrared camera;

receiving, from a user, a selection of target point on the first image or the second image;

setting a reference area with a predetermined range of temperatures around the target point selected by the user based on pixel values in the second image;

displaying the reference area in the first image or the second image; and transmitting the first image or the second image with the reference area displayed therein to a monitoring device.

17. The method of claim 16, further comprising:

providing the first image in an image output area; and based on a temperature of the reference area exceeding a predetermined threshold temperature, providing event information for the reference area in an event output area.

18. The method of claim 16, further comprising providing an interface, wherein providing the interface comprises:

displaying a temperature bar that visually represents a temperature range of the reference area; and positioning an icon enabling an adjustment of an upper limit temperature and a lower limit temperature.

19. A method of providing temperature information, comprising:

generating a first image by detecting visible light from a scene;

generating a second image by detecting infrared light from the scene;

receive, from a user, a selection of an object on the first image or the second image;

setting a reference area for the object selected by the user based on pixel values in the second image;

generating an edited image that displays the first image or the second image with the reference area visually indicated therein; and transmitting the edited image.

20. The method of claim 19, wherein setting the reference area comprises setting the reference area with a predetermined range of temperatures around a target point selected by the user in the first image or the second image based on pixel values in the second image; and wherein the method further comprises displaying the reference area in the first image or the second image.

\* \* \* \* \*